(12) United States Patent
Xu et al.

(10) Patent No.: US 11,550,599 B2
(45) Date of Patent: Jan. 10, 2023

(54) METHOD AND APPARATUS FOR RUNNING APPLET

(71) Applicant: Baidu Online Network Technology (Beijing) Co., Ltd., Beijing (CN)

(72) Inventors: Shaopeng Xu, Beijing (CN); Shuang Su, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 305 days.

(21) Appl. No.: 16/894,946

(22) Filed: Jun. 8, 2020

(65) Prior Publication Data
US 2021/0165666 A1    Jun. 3, 2021

(30) Foreign Application Priority Data

Nov. 29, 2019  (CN) .......................... 201911199931.8

(51) Int. Cl.
*G06F 9/44* (2018.01)
*G06F 9/445* (2018.01)

(52) U.S. Cl.
CPC ...... *G06F 9/44521* (2013.01); *G06F 9/44505* (2013.01); *G06F 9/44584* (2013.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 6,125,402 A | * | 9/2000 | Nagarajayya | ........... G06F 9/465 719/330 |
| 2003/0041263 A1 | * | 2/2003 | Devine | ................... G06Q 30/02 707/E17.107 |
| 2004/0123270 A1 | | 6/2004 | Zhuang | |
| 2010/0162277 A1 | | 6/2010 | Lee | |
| 2010/0223306 A1 | * | 9/2010 | Liu | ..................... G06F 9/44505 707/822 |
| 2016/0054989 A1 | | 2/2016 | Diebolt | |

(Continued)

FOREIGN PATENT DOCUMENTS

| | | |
|---|---|---|
| CN | 105407130 A | 3/2016 |
| CN | 106325847 A | 1/2017 |
| CN | 105260196 B | 8/2018 |

(Continued)

OTHER PUBLICATIONS

Written Opinion on the Patentability of the Invention in French Patent Application No. FR 2006000 dated Feb. 5, 2021 (8 pages).

(Continued)

*Primary Examiner* — Keshab R Pandey
(74) *Attorney, Agent, or Firm* — Nixon Peabody LLP

(57) ABSTRACT

A method and an apparatus for running an applet are provided. The method includes: reading, in response to issuing an applet to a host application, a configuration file to determine a dynamic library referenced by the applet; loading the dynamic library referenced by the applet from a sandbox directory and/or an applet platform; and running, in response to a running instruction of the applet, a script code of the applet to call the dynamic library referenced by the applet. When the applet is run, the dynamic library referenced by the applet is loaded from the sandbox directory and/or the applet platform, and the dynamic library is no longer integrated into the applet package.

18 Claims, 4 Drawing Sheets

(56) References Cited

U.S. PATENT DOCUMENTS

2017/0003954 A1  1/2017  Khan
2018/0181382 A1* 6/2018  Klemenz .................. G06F 8/61

FOREIGN PATENT DOCUMENTS

| CN | 109032691 A | 12/2018 |
|---|---|---|
| CN | 110389935 A | 10/2019 |
| CN | 110389936 A | 10/2019 |
| CN | 110908738 A | 3/2020 |

OTHER PUBLICATIONS

Kulakov, K., "The Practice of Porting Qt applications to Android platform," Proceedings of 12th Conference of Open Innovations Association FRUCT (FRUCT12), 2012, pp. 268-271.

"How to use dynamic library of Baidu applet in Okam framework"; retrieved from dynamicLab://myDynamicLib/special-list; 2019; in Chinese, English translation unavailable (3 pages).

"Hand-in-hand teaching you to develop plugins in WeChat applets"; Cryptic Concern, 2017; in Chinese, with English machine translation (22 pages).

* cited by examiner

METHOD AND APPARATUS FOR RUNNING APPLET

CROSS-REFERENCE TO RELATED APPLICATIONS

This application claims priority to Chinese Patent Application No. 201911199931.8, filed on Nov. 29, 2019, titled "Method and Apparatus for Running Applet," which is hereby incorporated by reference in its entirety.

TECHNICAL FIELD

Embodiments of the present disclosure relate to the field of computer technology, and specifically to a method and an apparatus for running an applet.

BACKGROUND

With the continuous development of computer technology, a variety of applications emerge one after another. An applet, an application that can be used without download and installation, has received extensive attention from all walks of life.

A traditional applet requires developers to develop all service modules and logics totally by themselves, and the development workload of the applet is heavy. In order to reduce the burden on the applet developers and facilitate the development of the applet, some commonly used APIs (application programming interfaces), components, pages, and the like, may be encapsulated into plug-ins for a direct reference by other applets. If a certain applet is to reference a plug-in, in a configuration file, not only an identifier of the plug-in needs to be configured, but also a version of the plug-in needs to be configured. In addition, the plug-in also needs to be integrated into an applet package. When the applet is run, the plug-in integrated in the applet package is directly used. If some new features are added to the plug-in and a new version is issued, to use the new features in the applet, the version of the plug-in in the configuration file must be manually modified to a latest version, and at the same time, the plug-in of the latest version is integrated into the applet package, and then the new applet package is submitted for review. After the new applet package passes the review, a period of time is further needed for convergence, and only after the convergence, when the applet is run, the user sees the new features.

SUMMARY

Embodiments of the present disclosure propose a method and apparatus for running an applet.

In a first aspect, the embodiments of the present disclosure propose a method for running an applet. The method includes: reading, in response to issuing an applet to a host application, a configuration file to determine a dynamic library referenced by the applet; loading the dynamic library referenced by the applet from a sandbox directory and/or an applet platform; and running, in response to a running instruction of the applet, a script code of the applet to call the dynamic library referenced by the applet.

In some embodiments, before the configuration file is read to determine the dynamic library referenced by the applet, the method further includes performing a signing and a security verification on the applet.

In some embodiments, the loading the dynamic library referenced by the applet from a sandbox directory and/or an applet platform includes: determining, for each dynamic library referenced by the applet, whether the dynamic library is stored in the sandbox directory; and downloading synchronously a dynamic library of a latest version from the applet platform and loading the dynamic library of the latest version, if the dynamic library is not stored.

In some embodiments, the loading the dynamic library referenced by the applet from a sandbox directory and/or an applet platform further includes: determining whether a download duration of the dynamic library exceeds an expiration period, if the sandbox directory stores the dynamic library; and downloading synchronously the dynamic library of the latest version from the applet platform and loading the dynamic library of the latest version, if the download duration exceeds the expiration period.

In some embodiments, the loading the dynamic library referenced by the applet from a sandbox directory and/or an applet platform further includes: loading the dynamic library stored in the sandbox directory, if the download duration does not exceed the expiration period, or if the download duration exceeds the expiration period but the dynamic library of the latest version fails to be downloaded.

In some embodiments, the loading the dynamic library referenced by the applet from a sandbox directory and/or an applet platform further includes: downloading asynchronously the dynamic library of the latest version, if the download duration does not exceed the expiration period and the dynamic library of the latest version is included in the applet platform.

In some embodiments, the downloaded dynamic library of the latest version is stored into the sandbox directory, a timeout time and version information of the dynamic library are stored into a database, and different applets share the dynamic library in the sandbox directory.

In some embodiments, the method further includes determining, when a script code of a master page of the applet is run, a dynamic library referenced by a slave page of the applet, and pre-downloading the dynamic library referenced by the slave page from the applet platform.

In some embodiments, the method further includes transmitting, when jumping to the slave page of the applet, a path of the sandbox directory to a front end, to cause the front end to preload the dynamic library referenced by the page from the path.

In some embodiments, the dynamic library is issued by acquiring an identifier of the dynamic library registered by a user on the applet platform; acquiring a script, a component and a page developed by the user using a development tool provided by the applet platform; encapsulating, if the script, the component and the page are successfully compiled and debugged, the script, the component and the page to obtain the dynamic library; and issuing simultaneously the dynamic library, an applet sample debugging the dynamic library and a document of the dynamic library.

In some embodiments, the applet references the dynamic library by: configuring the identifier of the dynamic library referenced by the applet in the configuration file; declaring a use component of the dynamic library referenced by the applet in a page file; specifying a position and a related attribute of the dynamic library referenced by the applet in a layout file; and calling the dynamic library referenced by the applet in the script code of the applet.

In a second aspect, the embodiments of the present disclosure propose an apparatus for running an applet. The apparatus includes a reading unit, configured to read, in response to issuing an applet to a host application, a configuration file to determine a dynamic library referenced by the applet; a loading unit, configured to load the dynamic library referenced by the applet from a sandbox directory and/or an applet platform; and a running unit, configured to run, in response to a running instruction of the applet, a script code of the applet to call the dynamic library referenced by the applet.

In some embodiments, the apparatus further includes a verifying unit, configured to perform a signing and a security verification on the applet.

In some embodiments, the loading unit includes: a first determining subunit, configured to determine, for each dynamic library referenced by the applet, whether the dynamic library is stored in the sandbox directory; and a first loading subunit, configured to synchronously download a dynamic library of a latest version from the applet platform and load the dynamic library of the latest version, if the dynamic library is not stored.

In some embodiments, the loading unit further includes: a second determining subunit, configured to determine whether a download duration of the dynamic library exceeds an expiration period, if the sandbox directory stores the dynamic library; and a second loading subunit, configured to synchronously download the dynamic library of the latest version from the applet platform and load the dynamic library of the latest version, if the download duration exceeds the expiration period.

In some embodiments, the loading unit further includes: a third loading subunit, configured to load the dynamic library stored in the sandbox directory, if the download duration does not exceed the expiration period, or if the download duration exceeds the expiration period but the dynamic library of the latest version fails to be downloaded.

In some embodiments, the loading unit further includes: an asynchronously downloading subunit, configured to asynchronously download the dynamic library of the latest version, if the download duration does not exceed the expiration period and the dynamic library of the latest version is included in the applet platform.

In some embodiments, the downloaded dynamic library of the latest version is stored into the sandbox directory, a timeout time and version information of the dynamic library are stored into a database, and different applets share the dynamic library in the sandbox directory.

In some embodiments, the apparatus further includes a pre-downloading unit, configured to determine, when a script code of a master page of the applet is run, a dynamic library referenced by a slave page of the applet, and pre-download the dynamic library referenced by the slave page from the applet platform.

In some embodiments, the apparatus further includes a preloading unit, configured to transmit, when jumping to the slave page of the applet, a path of the sandbox directory to a front end to cause the front end to preload the dynamic library referenced by the detail page from the path.

In some embodiments, the dynamic library is issued by: acquiring an identifier of the dynamic library registered by a user on the applet platform; acquiring a script, a component and a page developed by the user using a development tool provided by the applet platform; encapsulating, if the script, the component and the page are successfully compiled and debugged, the script, the component and the page to obtain the dynamic library; and issuing simultaneously the dynamic library, an applet sample debugging the dynamic library and a document of the dynamic library.

In some embodiments, the applet references the dynamic library by: configuring the identifier of the dynamic library referenced by the applet in the configuration file; declaring a use component of the dynamic library referenced by the applet in a page file; specifying a position and a related attribute of the dynamic library referenced by the applet in a layout file; and calling the dynamic library referenced by the applet in the script code of the applet.

In a third aspect, the embodiments of the present disclosure provide an electronic device. The electronic device includes one or more processors; and a storage apparatus, configured to store one or more programs, where the one or more programs, when executed by the one or more processors, cause the one or more processors to implement the method according to any embodiment of the first aspect.

In a fourth aspect, the embodiments of the present disclosure provide a computer readable medium, storing a computer program, where the program, when executed by a processor, implements the method according to any embodiment of the first aspect.

According to the method and apparatus for running an applet provided in the embodiments of the present disclosure, first, the configuration file is read to determine the dynamic library referenced by the applet, in response to issuing the applet to the host application. Then, the dynamic library referenced by the applet is loaded from the sandbox directory and/or the applet platform. Finally, the script code of the applet is run to call the dynamic library referenced by the applet, in response to the running instruction of the applet. When the applet is run, the dynamic library referenced by the applet is loaded from the sandbox directory and/or the applet platform, and the dynamic library is no longer integrated into the applet package. Even if new features are added to the dynamic library referenced by the applet, it is not necessary to integrate the dynamic library of the latest version into the applet package. Since the code of the applet package does not change, it is not necessary to re-review the applet package, thus greatly improving the convergence rate. In addition, the dynamic library is no longer integrated into the applet package, and is also isolated from the applet package in term of codes, thereby preventing the developer from modifying the code of the dynamic library or leaking the core implementation of the dynamic library.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant invention, rather than limiting the invention. In addition, it should be noted that, for ease of description, only parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
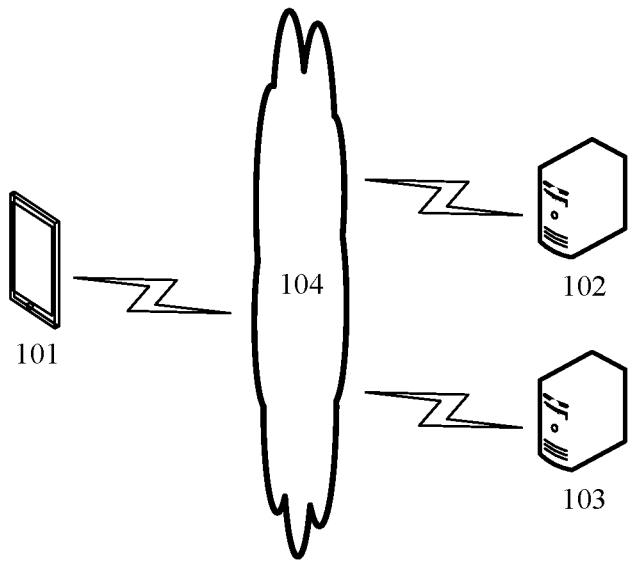
FIG. 1 is an example system architecture in which the present disclosure may be applied.

FIG. 1 illustrates an example system architecture 100 in which a method for running an applet or an apparatus for running an applet according to an embodiment of the present disclosure may be applied.

As shown in FIG. 1, the system architecture 100 may include devices 101, 102 and 103 and a network 104. The network 104 serves as a medium providing a communication link between the terminal devices 101, 102 and 103. The network 104 may include various types of connections, for example, wired or wireless communication links, or optical fiber cables.

The devices 101, 102 and 103 may be hardware devices or software supporting a network connection to provide various network services. When being hardware, the devices may be various electronic devices including, but not limited to, a smartphone, a tablet computer, a laptop portable computer, a desktop computer, a server, and the like. In this case, as the hardware devices, the devices may be implemented as a distributed device cluster composed of a plurality of devices, or may be implemented as a single device. When being the software, the devices may be installed in the above listed electronic devices. In this case, the devices may be implemented as a plurality of pieces of software or a plurality of software modules (e.g., pieces of software or software modules for providing a distributed service), or may be implemented as a single piece of software or a single software module, which will not be specifically defined here.

In practice, a device may provide a corresponding network service by installing a corresponding client application or a corresponding server side application. After the client application is installed, the device may be embodied as a client in a network communication. Correspondingly, after the server-side application is installed, the device may be embodied as a server side in the network communication.

As an example, in FIG. 1, the device 101 is embodied as a client and the devices 102 and 103 are embodied as server sides. For example, the device 101 may be a client installed with a host application, the device 102 may be a server side of the host application, and the device 103 may be a server side of an applet.

It should be noted that the method for running an applet provided in the embodiments of the present disclosure is generally performed by the device 101. Correspondingly, the apparatus for running an applet is generally provided in the device 101.

It should be appreciated that the numbers of the networks and the devices in FIG. 1 are merely illustrative. Any number of networks and devices may be provided based on actual requirements.

Figure 2:
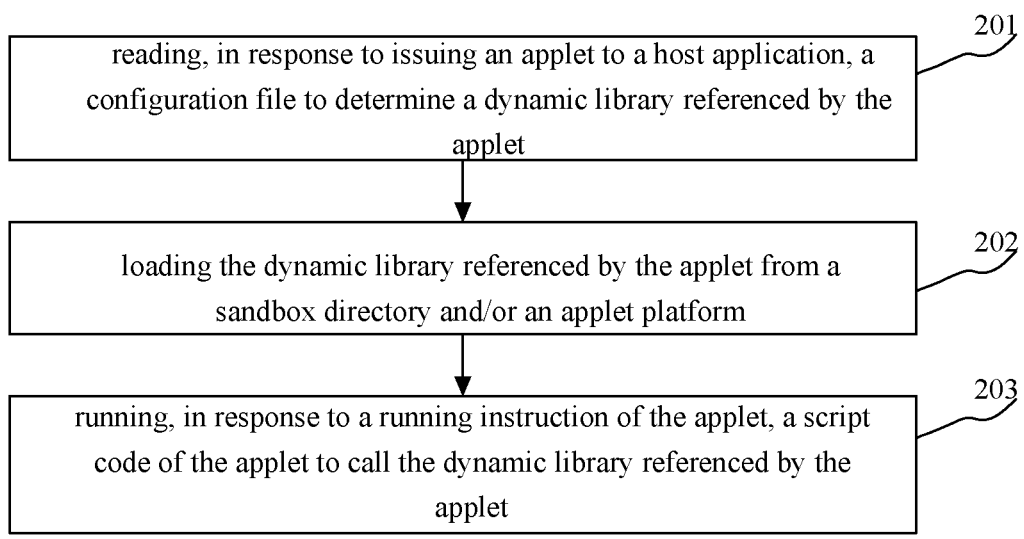
FIG. 2 is a flowchart of a method for running an applet according to an embodiment of the present disclosure.

Further referring to FIG. 2, FIG. 2 illustrates a flow 200 of a method for running an applet according to and embodiment of the present disclosure. The method for running an applet includes the following steps.

Step 201 includes reading, in response to issuing an applet to a host application, a configuration file to determine a dynamic library referenced by the applet.

In this embodiment, when the applet is issued to the host application, an executing body (e.g., the device 101 shown in FIG. 1) of the method for running an applet may read the configuration file to determine the dynamic library referenced by the applet.

Here, for example, the host application may be a client application such as an instant communication application and a search application. The applet may be an application program running in the host application. The running of the applet depends on the host application. The host application may run a plurality of applets. Generally, if a user wants to run the applet, the host application needs to be searched for the applet. If the search result page includes the applet, the applet is issued to the host application.

Here, the configuration file may be app.json. Each applet corresponds to one configuration file, and the configuration file records the identifier of the dynamic library referenced by the corresponding applet. One applet may reference a plurality of different dynamic libraries. A dynamic library may be obtained by encapsulating a script, a component, a page and the like, which are commonly and frequently used in the development of the applet. The identifier of the dynamic library may be, for example, the name and/or the alias of the dynamic library. The name of the dynamic library is unique on an applet platform. The alias of the dynamic library is unique in a given applet. In addition, the configuration file no longer records the version of the dynamic library referenced by the applet. Therefore, even if the version is updated due to a newly added feature of the dynamic library referenced by the applet, the latest version of the dynamic library referenced by the applet does not need to be updated in the configuration file, and no new applet package needs to be reviewed, thereby greatly improving the convergence rate.

In some alternative implementations of this embodiment, the dynamic library may be issued through the following steps:

First, the identifier of the dynamic library registered by the user on the applet platform is acquired.

Generally, when developing a dynamic library, a developer needs to register the identifier of the dynamic library on the applet platform.

Then, a script, a component and a page developed by the user using a development tool provided by the applet platform are acquired.

Generally, the applet platform provides the development tool, and the developer may use the development tool provided by the applet platform to develop the script (JS), the component, the page and the like, which are commonly and frequently used.

Next, if the script, the component and the page are successfully compiled and debugged, the script, the component and the page are encapsulated to obtain the dynamic library.

Generally, the script, the component, the page and the like need to be compiled and debugged. After being compiled and debugged, the script, the component, the page and the like are encapsulated into the dynamic library. In addition, the dynamic library provides the API externally, and the applet implements the reference to the dynamic library by calling the API of the dynamic library.

Finally, the dynamic library, an applet sample debugging the dynamic library and a document of the dynamic library are issued simultaneously.

Generally, for issuing the dynamic library, it is required to provide the dynamic library, the applet sample debugging the dynamic library and the document of the dynamic library, and issue the three files simultaneously. Here, the dynamic library is the content developed by the developer and referenced by other applets. The applet sample debugging the dynamic library may be reviewed by a reviewer, and used for debugging and preview by the applet developer using the dynamic library. The document of the dynamic library may provide an API of the feature provided by the dynamic library, to facilitate the access of the developer.

It should be appreciated that the script, component, page and the like commonly and frequently used in the development of the applet are encapsulated into the dynamic library, and uploaded to the applet platform for other applets to reference. For a dynamic library that may be referenced from the applet platform, the applet developer does not need to redevelop, thereby reducing the workload of developing the applet.

In some alternative implementations of this embodiment, the applet may reference the dynamic library through the following steps:

First, the identifier of the dynamic library referenced by the applet is configured in the configuration file.

Here, for example, the code for configuring the identifier of the dynamic library referenced by the applet in the configuration file may be:

```
app.json
{
    "dynamicLib":{
        "myAliasA":{
            "provider":"DynamicLibAAA"
        }
        "myAliasB":{
            "provider":"DynamicLibBBB"
        }
    }
}
```

Here, app.json is a configuration file, dynamicLib is a place for declaration of a dynamic library referenced by an applet, myAliasA and myAliasB are aliases of dynamic libraries referenced by the applet, and DynamicLibAAA and DynamicLibBBB are names of the dynamic libraries referenced by the applet.

Then, a use component of the dynamic library referenced by the applet is declared in the page file.

Here, for example, the code for declaring the use component of the dynamic library referenced by the applet in the page file may be:

```
xxxPage.json
{
    "usingComponents":{
        "my-component":"dynamicLib://myAliasA/hello-component"
    }
}
```

Here, xxxPage.json is a page file, usingComponents is the declaration of the use component in the page file, and my-component:dynamicLib://myAliasA/hello-component is a declaration of using a hello-component page of a dynamic library having an alias myAliasA.

Next, a position and a related attribute of the dynamic library referenced by the applet are specified in a layout file.

Here, for example, the code for specifying the position and the related attribute of the dynamic library referenced by the applet in the layout file may be:

```
xxxPage.swan
<view>
    <my-component></my-component>
</view>
```

Here, xxxPage.swan is a layout file, and <my-component></my-component> is a position referencing this dynamic library in xxxPage.swan.

Finally, the dynamic library referenced by the applet is called in a script code of the applet.

Here, for example, the code for calling the dynamic library referenced by the applet in the script code of the applet may be:

```
xxxPage.js
    var lib=requireDynamicLib('myAliasA');
```

Here, xxxPage.js is a script code of an applet, and var lib=requireDynamicLib('myAliasA') is loading of the dynamic library having the alias myAliasA in the xxxPage.js code.

In some alternative implementations of the embodiment, the above executing body may perform signing and a security verification on the applet. The above executing body only reads the configuration file after the signing and passing the security verification.

Step 202 includes loading the dynamic library referenced by the applet from a sandbox directory and/or an applet platform.

In the embodiment, for each dynamic library referenced by the applet, the above executing body may load the dynamic library from the sandbox directory or the applet platform. For example, if the latest version of the dynamic library issued on the applet platform is consistent with the version of the dynamic library stored in the sandbox directory, the above executing body may directly load the dynamic library from the sandbox directory. If the latest version of the dynamic library issued on the applet platform is inconsistent with the version of the dynamic library stored in the sandbox directory, the above executing body may download the latest version of the dynamic library from the applet platform in real time, and load the latest version of the dynamic library. In addition, the dynamic library of the downloaded latest version is stored in the sandbox directory for a reference by the applet when the applet is run next time.

Generally, after the feature of the dynamic library is updated, the applet referencing the dynamic library does not need to change the reference to the dynamic library in the configuration file, and does not need to reissue the applet package. When the user opens the applet, the applet platform is queried to determine whether the feature of the dynamic library is updated. If the feature is not updated, the dynamic library in the sandbox directory is used. If the feature is updated, the dynamic library of the latest version is downloaded from the applet platform to the sandbox directory, and the new feature of the dynamic library can be presented when the applet is run.

It should be understood that the code of the dynamic library referenced by the applet is not integrated into the applet package when the applet is packaged, but downloaded to the sandbox directory when in use, and the code and the storage directory of the applet are stored in parallel, but isolated from each other in term of codes. In this way, the advantages at least include: 1) isolation: the storages of the code of the applet and the code of the dynamic library are isolated, preventing the developer from modifying the code of the dynamic library or leaking the core implementation of the dynamic library, and there is only the relationship of calling the API between the applet and the dynamic library, and thus, an interface implementation layer is not visible to the user; 2) reuse: different applets may share the dynamic library in the sandbox directory, and if two applets refer to a given dynamic library, and one applet has downloaded the dynamic library of the latest version when running, the other applet, when running, directly loads the dynamic library of the latest version from the sandbox directory without repeatedly downloading the dynamic library, thus achieving the purpose of reuse; and 3) security: the dynamic library is stored in the sandbox directory, which greatly reduces the risk of being cracked by the user and other competitors, and is more secure than the storage in a storage card or the direct integration of the code into the applet package.

Step 203 includes running, in response to a running instruction of the applet, a script code of the applet to call the dynamic library referenced by the applet.

In the embodiment, when receiving the running instruction of the applet, the above executing body may run the script code of the applet to call the dynamic library referenced by the applet, to use the feature provided by the dynamic library. Here, when any page of the applet is entered through a click, it may be considered that the running instruction of the applet is received. The pages of the applet may include a master page and a slave page.

In some alternative implementations of the embodiment, the above executing body may pre-download and preload the dynamic library. Specifically, when a script code of a master page of the applet is run, the above executing body may determine the dynamic library referenced by a slave page of the applet and pre-download the dynamic library referenced by the slave page from the applet platform. When jumping to the slave page of the applet, the above executing body may transmit the path of the sandbox directory to a front end, to cause the front end to preload the dynamic library referenced by the slave page from the path. Here, the applet framework Runtime (in a running state) provides a capability to pre-download the dynamic library. Generally, some dynamic libraries are referenced on the slave page of the applet. After the master page of the applet is open, the above executing body may dynamically call a pre-download capability: PreDownloadSwanPlugin, to perform batch download of the dynamic libraries referenced by the slave page, so that the pages of the referenced dynamic libraries can be prepared in advance when jumping to the slave page. When jumping to the slave page, the above executing body may transmit the path of the sandbox directory to the front end when the page preparation event of the slave page is generated, and the front end frame may preload the code of the dynamic library under the path, and thus can execute the corresponding script logic when the slave page is rendered.

According to the method for running an applet provide in the embodiment of the present disclosure, first, the configuration file is read to determine the dynamic library referenced by the applet, in response to issuing the applet to the host application. Then, the dynamic library referenced by the applet is loaded from the sandbox directory and/or the applet platform. Finally, the script code of the applet is run to call the dynamic library referenced by the applet, in response to the running instruction of the applet. When the applet is run, the dynamic library referenced by the applet is loaded from the sandbox directory and/or the applet platform, and the dynamic library is no longer integrated into the applet package. Even if features are added to the dynamic library referenced by the applet, it is not necessary to integrate the dynamic library of the latest version into the applet package. Since the code of the applet package does not change, it is not necessary to review the applet package again, thus greatly improving the convergence rate. In addition, the dynamic library is no longer integrated into the applet package, and is also isolated from the applet package in term of codes, thereby preventing the developer from modifying the code of the dynamic library or leaking the core implementation of the dynamic library.

Figure 3:
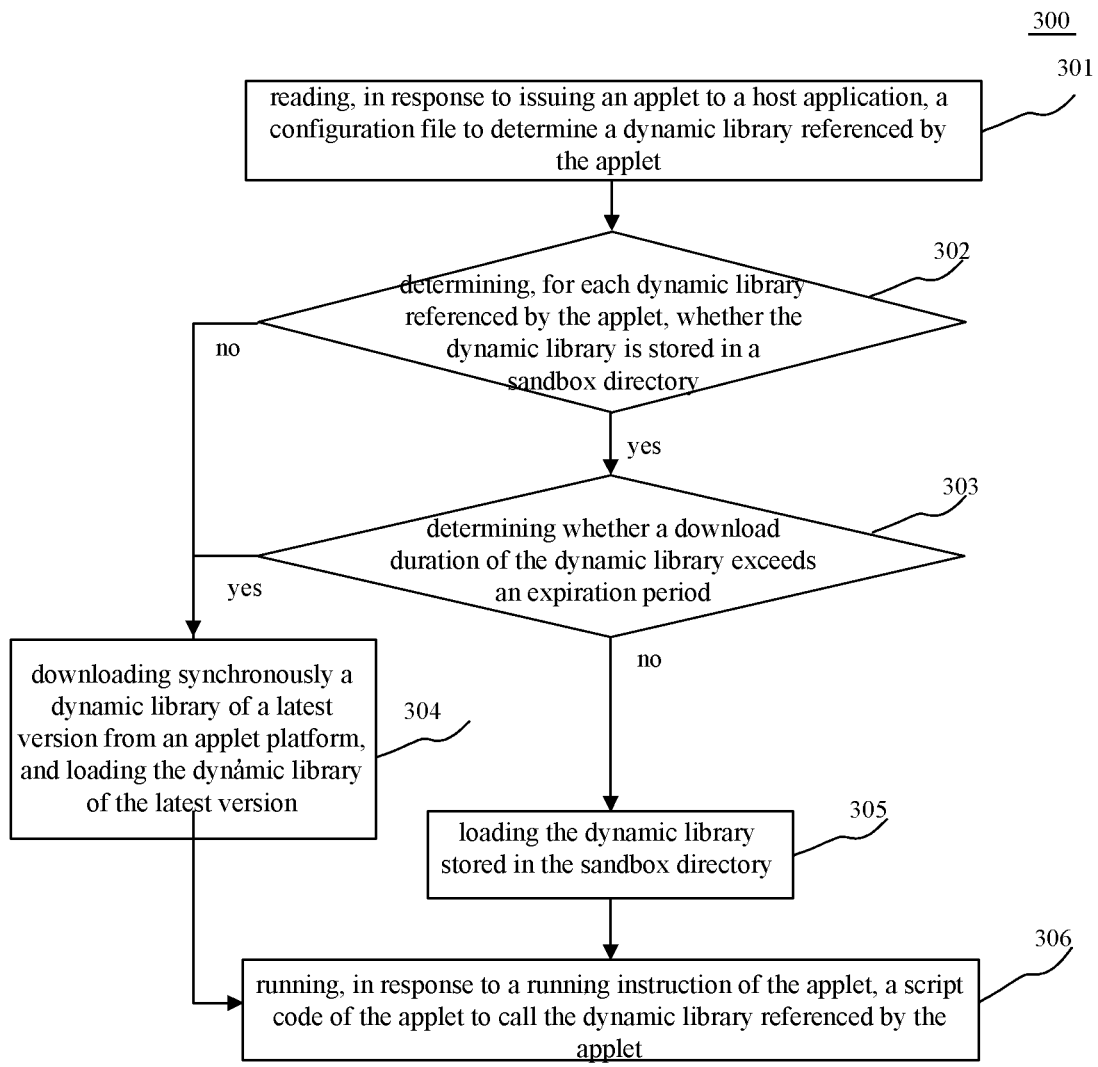
FIG. 3 is a flowchart of a method for running an applet according to another embodiment of the present disclosure.

Further referring to FIG. 3, FIG. 3 illustrates a flow 300 of a method for running an applet according to another embodiment of the present disclosure. The method for running an applet includes the following steps.

Step 301 includes reading, in response to issuing an applet to a host application, a configuration file to determine a dynamic library referenced by the applet.

In the embodiment, the specific operation of step 301 is described in detail in step 201 in the embodiment shown in FIG. 2, which will not be repeatedly described here.

Step 302 includes determining, for each dynamic library referenced by the applet, whether the dynamic library is stored in a sandbox directory.

In the embodiment, for each dynamic library referenced by the applet, an executing body (e.g., the device 101 shown in FIG. 1) of the method for running an applet may query the sandbox directory to determine whether the dynamic library is stored in the sandbox directory. If the dynamic library is stored in the sandbox directory, step 303 is performed. If the dynamic library is not stored in the sandbox directory, step 304 is performed.

Step 303 includes determining whether a download duration of the dynamic library exceeds an expiration period.

In the embodiment, if the sandbox directory stores the dynamic library, the above executing body may determine whether the download duration of the dynamic library exceeds the expiration time. If the download duration exceeds the expiration time, step 304 is performed. If the download duration does not exceed the expiration time, step 305 is performed. Here, the expiration period may be maxAge, typically 1 hour.

Step 304 includes downloading synchronously a dynamic library of a latest version from an applet platform, and loading the dynamic library of the latest version.

In the embodiment, if the dynamic library is not stored, or the download duration of the stored dynamic library exceeds the expiration period, the above executing body may download the dynamic library of the latest version from the applet platform synchronously, and load the dynamic library of the latest version. Here, the synchronistic download may be a real-time download. For example, as long as it is determined that the dynamic library is not stored, or the download duration of the stored dynamic library exceeds the expiration period, a communication between the above executing body and the applet platform is established immediately, and the dynamic library of the latest version is downloaded in real time from the applet platform.

Generally, after an applet references a dynamic library, when a user first opens the applet, if the framework Runtime detects that the sandbox directory does not have a dynamic library of any version, a dynamic library of a latest version is synchronously downloaded to the sandbox directory, and the information (e.g., the expiration period and the version)

of the dynamic library is stored in a database. In addition, when a cold start of the applet is performed again, if a period since the last time the dynamic library is downloaded exceeds the expiration period, it indicates that the dynamic library in the sandbox directory is invalid. The dynamic library of the latest version is synchronously downloaded to the sandbox directory again, and the information (e.g., the expiration period and the version) of the dynamic library is stored in the database.

In some alternative implementations of the embodiment, the downloaded dynamic library of the latest version may be stored in the sandbox directory, and a timeout time and version information of the dynamic library may be stored in a database. Different applets may share the dynamic library in the sandbox directory. That is, the dynamic library may be reused. For example, if two applets reference a given dynamic library, and one applet has downloaded the dynamic library of the latest version when running, the other applet, when running, directly loads the dynamic library of the latest version from the sandbox directory without repeatedly downloading the dynamic library, thus achieving the purpose of reuse.

Step 305 includes loading the dynamic library stored in the sandbox directory.

In the embodiment, if the download duration does not exceed the expiration period, the above executing body may load the dynamic library stored in the sandbox directory. In addition, if the download duration exceeds the expiration period but the dynamic library of the latest version fails to be downloaded, the above executing body may also load the dynamic library stored in the sandbox directory. For example, if the applet platform does not issue a version that is different from that of the dynamic library stored in the sandbox directory, it indicates that the dynamic library stored in the sandbox directory is the dynamic library of the latest version. In this case, the dynamic library is not downloaded from the applet platform even if the downloaded duration exceeds the expiration period.

Generally, when a cold start of the applet is performed again, if the period since the last time the dynamic library is downloaded does not exceed the expiration period, it indicates that the dynamic library in the sandbox directory is valid. Thus, the dynamic library of the latest version is not downloaded, and the dynamic library of the latest version in the sandbox directory is directly used. In addition, when the cold start of the applet is performed again, if the period since the last time the dynamic library is downloaded exceeds the expiration period but the applet platform does not have a dynamic library of an updated version, it indicates that the dynamic library stored in the sandbox directory is the dynamic library of the latest version. Thus, the dynamic library of the latest version in the sandbox directory is directly used.

In some alternative implementations of the embodiment, if the download duration does not exceed the expiration period and there is the dynamic library of the latest version on the applet platform, the above executing body may asynchronously download the dynamic library of the latest version. The downloaded dynamic library of the latest version may be stored in the sandbox directory for use the next time the applet runs. Here, the asynchronous download may be a non-real-time download. For example, if it is determined that the stored download duration of the dynamic library does not exceed the expiration period, after the running of the applet is finished this time, a communication between the above executing body and the applet platform may be established and the dynamic library of the latest version is downloaded from the applet platform.

Step 306 includes running, in response to a running instruction of the applet, a script code of the applet to call the dynamic library referenced by the applet.

In the embodiment, the specific operation of step 306 is described in detail in step 203 in the embodiment shown in FIG. 2, which will not be repeatedly described here.

Figure 4:
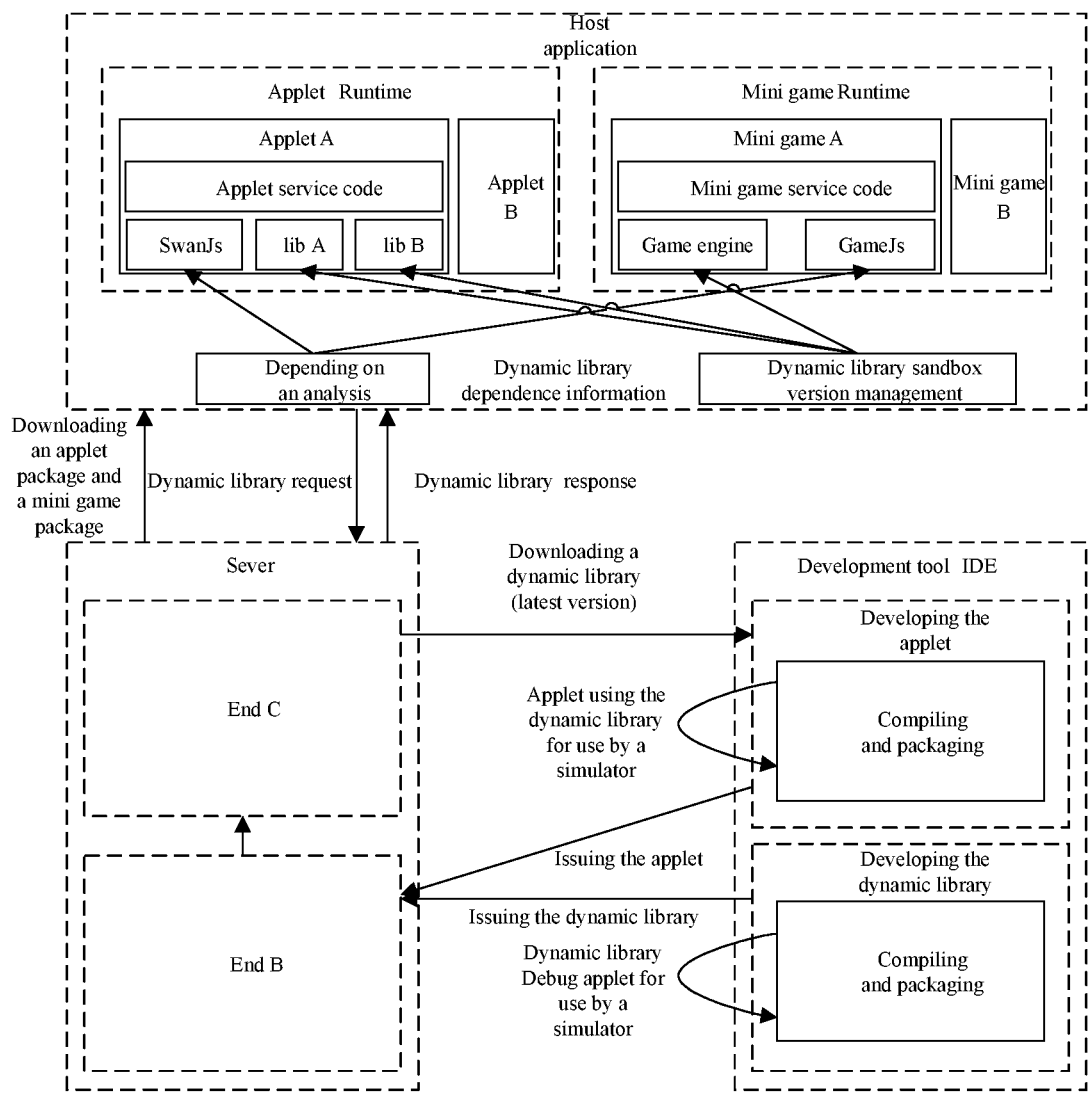
FIG. 4 is a diagram of an architecture in which an applet runs.

Further referring to FIG. 4, FIG. 4 is a diagram of an architecture in which an applet runs. As shown in FIG. 4, if a developer wants to issue a dynamic library A and a dynamic library B, the names and the aliases of the dynamic library A and the dynamic library B need to be registered on an applet platform. Here, the name of the dynamic library A is DynamicLibAAA, and the alias is myAliasA. The name of the dynamic library B is DynamicLibBBB, and the alias is myAliasB. The developer may use a development tool IDE provided by the applet platform to develop scripts, components and pages, compile and package them into the dynamic library A and a dynamic library B, and issue the dynamic library A and the dynamic library B on the B end of the applet platform. If an applet A and a mini game A want to reference the dynamic library A and the dynamic library B, the names and the aliases of the dynamic library A and the dynamic library B need to be configured in a configuration file app.json. In a page file Page.json, use components of the dynamic library A and the dynamic library B are declared. The positions and related attributes of the dynamic library A and the dynamic library B are specified in the layout file Page.swan. The dynamic library A and the dynamic library B are called in the script codes of the applet A and the mini game A to be compiled and packaged into an applet package A and a mini game package A, and issued on the end B of the applet platform. The applet A, an applet B, the mini game A and a mini game B may be issued to a host application. If the applet A and the mini game A need to be run, it is necessary to analyze the configuration file to determine that the applet A and the mini game A depend on the dynamic library A and the dynamic library B. Whether the latest versions of the dynamic library A and the dynamic library B are stored in the sandbox directory is determined. If the latest versions are not stored, the dynamic library A of the latest version and the dynamic library B of the latest version are downloaded from end C of the applet platform. When a user wants to run the applet A or the mini game B, the applet package A or the mini game package A is downloaded from the applet platform, and script codes are run to call the dynamic library A and the dynamic library B.

It may be seen from FIG. 3 that, as compared with the embodiment corresponding to FIG. 2, the flow 300 of the method for running an applet in the embodiment emphasizes the step of loading the dynamic library. Therefore, according to the scheme described in the embodiment, when the applet is run, whether to synchronously download the dynamic library of the latest version is determined by determining whether the download duration of the dynamic library exceeds the expiration period. Thus, the convergence rate of the dynamic library is ensured, and excessive pressure on the applet platform will not be caused since the dynamic library is not frequently downloaded.

Figure 5:
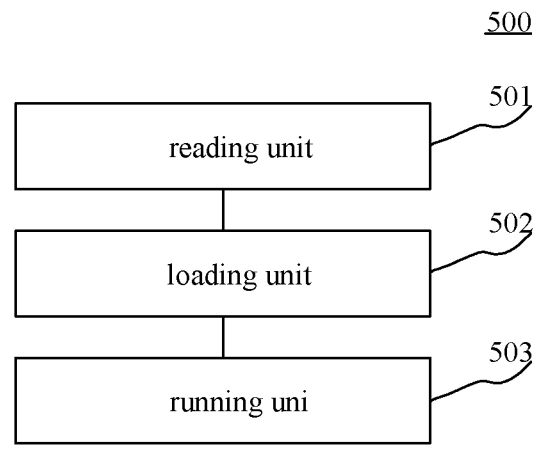
FIG. 5 is a schematic structural diagram of an apparatus for running an applet according to an embodiment of the present disclosure.

Further referring to FIG. 5, as an implementation of the method shown in the above drawings, the present disclosure provides an embodiment of an apparatus for running an applet. The embodiment of the apparatus corresponds to the embodiment of the method shown in FIG. 2, and the apparatus may be applied in various electronic devices.

As shown in FIG. 5, the apparatus 500 for running an applet in this embodiment may include a reading unit 501, a loading unit 502 and a running unit 503. Here, the reading unit 501 is configured to read, in response to issuing an applet to a host application, a configuration file to determine a dynamic library referenced by the applet. The loading unit 502 is configured to load the dynamic library referenced by the applet from a sandbox directory and/or an applet platform. The running unit 503 is configured to run, in response to a running instruction of the applet, a script code of the applet to call the dynamic library referenced by the applet.

In the embodiment, for specific processes of the reading unit 501, the loading unit 502 and the running unit 503 in the apparatus 500 for running an applet, and their technical effects, reference may be made respectively to the relative descriptions of steps 201-203 in the corresponding embodiment of FIG. 2, which will not be repeatedly described here.

In some alternative implementations of this embodiment, the apparatus 500 for running an applet further includes a verifying unit (not shown in the drawing), configured to perform signing and a security verification on the applet.

In some alternative implementations of this embodiment, the loading unit 502 includes: a first determining subunit (not shown in the drawing), configured to determine, for each dynamic library referenced by the applet, whether the dynamic library is stored in the sandbox directory; and a first loading subunit (not shown in the drawing), configured to synchronously download a dynamic library of a latest version from the applet platform and load the dynamic library of the latest version, if the dynamic library is not stored.

In some alternative implementations of this embodiment, the loading unit 502 includes: a second determining subunit (not shown in the drawing), configured to determine whether a download duration of the dynamic library exceeds an expiration period, if the sandbox directory stores the dynamic library; and a second loading subunit (not shown in the drawing), configured to synchronously download the dynamic library of the latest version from the applet platform and load the dynamic library of the latest version, if the download duration exceeds the expiration period.

In some alternative implementations of this embodiment, the loading unit 502 includes: a third loading subunit (not shown in the drawing), configured to load the dynamic library stored in the sandbox directory, if the download duration does not exceed the expiration period, or if the download duration exceeds the expiration period but the dynamic library of the latest version fails to be downloaded.

In some alternative implementations of this embodiment, the loading unit 502 further includes: an asynchronously downloading subunit (not shown in the drawing), configured to asynchronously download the dynamic library of the latest version, if the download duration does not exceed the expiration period and the dynamic library of the latest version is included in the applet platform.

In some alternative implementations of the embodiment, the downloaded dynamic library of the latest version is stored into the sandbox directory, a timeout time and version information of the dynamic library are stored into a database, and different applets share the dynamic library in the sandbox directory.

In some alternative implementations of this embodiment, the apparatus 500 for running an applet further includes: a pre-downloading unit (not shown in the drawing), configured to determine, when a script code of a master page of the applet is run, a dynamic library referenced by a slave page of the applet, and pre-download the dynamic library referenced by the slave page from the applet platform.

In some alternative implementations of the embodiment, the apparatus 500 for running an applet further includes: a preloading unit (not shown in the drawing), configured to transmit, when jumping to the slave page of the applet, a path of the sandbox directory to a front end to cause the front end to preload the dynamic library referenced by the slave page from the path.

In some alternative implementations of the embodiment, the dynamic library is issued by: acquiring an identifier of the dynamic library registered by a user on the applet platform; acquiring a script, a component and a page developed by the user using a development tool provided by the applet platform; encapsulating, if the script, the component and the page are successfully compiled and debugged, the script, the component and the page to obtain the dynamic library; and issuing simultaneously the dynamic library, an applet sample debugging the dynamic library and a document of the dynamic library.

In some alternative implementations of the embodiment, the applet references the dynamic library by: configuring the identifier of the dynamic library referenced by the applet in the configuration file; declaring a use component of the dynamic library referenced by the applet in a page file; specifying a position and a related attribute of the dynamic library referenced by the applet in a layout file; and calling the dynamic library referenced by the applet in the script code of the applet.

Figure 6:
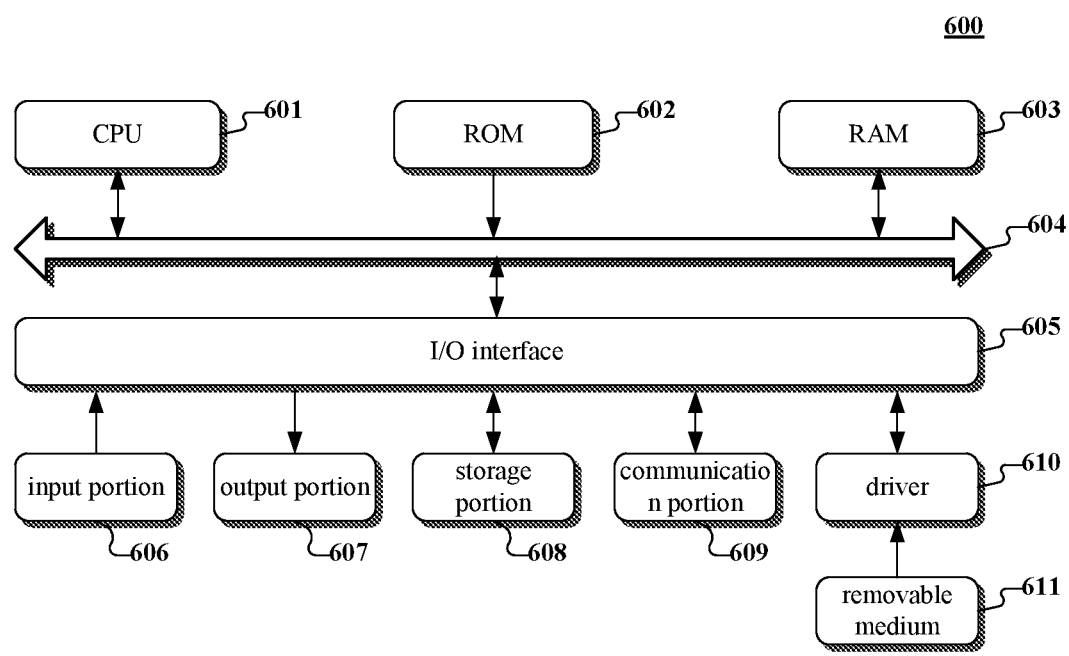
FIG. 6 is a schematic structural diagram of a computer system adapted to implement an electronic device according to embodiments of the present disclosure.

Referring to FIG. 6, FIG. 6 is a schematic structural diagram of a computer system 600 adapted to implement an electronic device (e.g., the device 101 shown in FIG. 1) of the embodiments of the present disclosure. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display (LCD), a speaker, etc.; the storage portion 608 including a hard disk, etc.; and a communication portion 609 including a network interface card such as a LAN card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus or device, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical storage device, a magnet storage device or any suitable combination of the above. In the present disclosure, the computer readable storage medium may be any physical medium containing or storing programs, which may be used by a command execution system, apparatus or device or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or device. The program codes contained on the computer readable medium may be transmitted with any suitable medium including, but not limited to, wireless, wired, optical cable, RF medium, or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor. For example, the processor may be described as: a processor including a reading unit, a loading unit and a running unit. Here, the names of these units do not in some cases constitute a limitation to such units themselves. For example, the reading unit may alternatively be described as "a unit for reading, in response to issuing an applet to a host application, a configuration file to determine a dynamic library referenced by the applet."

In another aspect, the present disclosure further provides a computer readable medium. The computer readable medium may be the computer readable medium included in the electronic device described in the above embodiments, or a stand-alone computer readable medium not assembled into the electronic device. The computer readable medium carries one or more programs. The one or more programs, when executed by the electronic device, cause the electronic device to: read, in response to issuing an applet to a host application, a configuration file to determine a dynamic library referenced by the applet; load the dynamic library referenced by the applet from a sandbox directory and/or an applet platform; and run, in response to a running instruction of the applet, a script code of the applet to call the dynamic library referenced by the applet.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for running an applet, comprising:
reading, in response to issuing an applet to a host application, a configuration file to determine a dynamic library referenced by the applet;
loading the dynamic library referenced by the applet from a sandbox directory and/or an applet platform; and
running, in response to a running instruction of the applet, a script code of the applet to call the dynamic library referenced by the applet,
wherein the method is performed by a hardware processor, and wherein the loading the dynamic library referenced by the applet from a sandbox directory and/or an applet platform comprises:
  determining, for each dynamic library referenced by the applet, whether the dynamic library is stored in the sandbox directory;
  determining whether a download duration of the dynamic library exceeds an expiration period, if the sandbox directory stores the dynamic library; and
  downloading synchronously a dynamic library of the latest version from the applet platform and loading the dynamic library of the latest version, if the download duration exceeds the expiration period.

2. The method according to claim 1, wherein before the configuration file is read to determine the dynamic library referenced by the applet, the method further comprises:
  performing a signing and a security verification on the applet.

3. The method according to claim 1, wherein the loading the dynamic library referenced by the applet from a sandbox directory and/or an applet platform further comprises:
  downloading synchronously the dynamic library of a latest version from the applet platform and loading the dynamic library of the latest version, if the dynamic library is not stored.

4. The method according to claim 1 wherein the loading the dynamic library referenced by the applet from a sandbox directory and/or an applet platform further comprises: loading the dynamic library stored in the sandbox directory, if the download duration does not exceed the expiration period, or if the download duration exceeds the expiration period but the dynamic library of the latest version fails to be downloaded.

5. The method according to claim 4, wherein the loading the dynamic library referenced by the applet from a sandbox directory and/or an applet platform further comprises:
  downloading asynchronously the dynamic library of the latest version, if the download duration does not exceed the expiration period and the dynamic library of the latest version is included in the applet platform.

6. The method according to claim 3, wherein the downloaded dynamic library of the latest version is stored into the sandbox directory, a timeout time and version information of the dynamic library are stored into a database, and different applets share the dynamic library in the sandbox directory.

7. The method according to claim 1, further comprising:
  determining, when a script code of a master page of the applet is run, a dynamic library referenced by a slave page of the applet, and pre-downloading the dynamic library referenced by the slave page from the applet platform.

8. The method according to claim 7, further comprising:
  transmitting, when jumping to the slave page of the applet, a path of the sandbox directory to a front end, to cause the front end to preload the dynamic library referenced by the page from the path.

9. The method according to claim 1, wherein the dynamic library is issued by:
  acquiring an identifier of the dynamic library registered by a user on the applet platform;
  acquiring a script, a component and a page developed by the user using a development tool provided by the applet platform;
  encapsulating, if the script, the component and the page are successfully compiled and debugged, the script, the component and the page to obtain the dynamic library; and
  issuing simultaneously the dynamic library, an applet sample debugging the dynamic library and a document of the dynamic library.

10. The method according to claim 9, wherein the applet references the dynamic library by:
  configuring the identifier of the dynamic library referenced by the applet in the configuration file;
  declaring a use component of the dynamic library referenced by the applet in a page file;
  specifying a position and a related attribute of the dynamic library referenced by the applet in a layout file; and
  calling the dynamic library referenced by the applet in the script code of the applet.

11. An apparatus for running an applet, comprising:
  at least one processor; and
  a memory storing instructions, wherein the instructions when executed by the at least one processor, cause the at least one processor to perform operations, the operations comprising:
  reading, in response to issuing an applet to a host application, a configuration file to determine a dynamic library referenced by the applet;
  loading the dynamic library referenced by the applet from a sandbox directory and/or an applet platform; and
  running, in response to a running instruction of the applet, a script code of the applet to call the dynamic library referenced by the applet
  wherein the loading the dynamic library referenced by the applet from a sandbox directory and/or an applet platform comprises:
  determining, for each dynamic library referenced by the applet, whether the dynamic library is stored in the sandbox directory;
  determining whether a download duration of the dynamic library exceeds an expiration period, if the sandbox directory stores the dynamic library; and
  downloading synchronously a dynamic library of the latest version from the applet platform and loading the dynamic library of the latest version, if the download duration exceeds the expiration period.

12. The apparatus according to claim 11, wherein the loading the dynamic library referenced by the applet from a sandbox directory and/or an applet platform further comprises:
  synchronously downloading the dynamic library of a latest version from the applet platform and load the dynamic library of the latest version, if the dynamic library is not stored.

13. The apparatus according to claim 11, wherein the loading the dynamic library referenced by the applet from a sandbox directory and/or an applet platform further comprises: loading the dynamic library stored in the sandbox directory, if the download duration does not exceed the expiration period, or if the download duration exceeds the expiration period but the dynamic library of the latest version fails to be downloaded.

14. The apparatus according to claim 13, wherein the loading the dynamic library referenced by the applet from a sandbox directory and/or an applet platform further comprises:
  asynchronously downloading the dynamic library of the latest version, if the download duration does not exceed the expiration period and the dynamic library of the latest version is included in the applet platform.

15. The apparatus according to claim 12, wherein the downloaded dynamic library of the latest version is stored into the sandbox directory, a timeout time and version information of the dynamic library are stored into a database, and different applets share the dynamic library in the sandbox directory.

16. The apparatus according to claim 11, wherein the dynamic library is issued by:
   acquiring an identifier of the dynamic library registered by a user on the applet platform;
   acquiring a script, a component and a page developed by the user using a development tool provided by the applet platform;
   encapsulating, if the script, the component and the page are successfully compiled and debugged, the script, the component and the page to obtain the dynamic library; and
   issuing simultaneously the dynamic library, an applet sample debugging the dynamic library and a document of the dynamic library.

17. The apparatus according to claim 16, wherein the applet references the dynamic library by:
   configuring the identifier of the dynamic library referenced by the applet in the configuration file;
   declaring a use component of the dynamic library referenced by the applet in a page file;
   specifying a position and a related attribute of the dynamic library referenced by the applet in a layout file; and
   calling the dynamic library referenced by the applet in the script code of the applet.

18. A non-transitory computer readable medium, storing a computer program, wherein the program, when executed by a processor, cause the processor to perform operations, the operations comprising:
   reading, in response to issuing an applet to a host application, a configuration file to determine a dynamic library referenced by the applet;
   loading the dynamic library referenced by the applet from a sandbox directory and/or an applet platform; and
   running, in response to a running instruction of the applet, a script code of the applet to call the dynamic library referenced by the applet
   wherein the loading the dynamic library referenced by the applet from a sandbox directory and/or an applet platform comprises:
   determining, for each dynamic library referenced by the applet, whether the dynamic library is stored in the sandbox directory;
   determining whether a download duration of the dynamic library exceeds an expiration period, if the sandbox directory stores the dynamic library; and
   downloading synchronously a dynamic library of the latest version from the applet platform and loading the dynamic library of the latest version, if the download duration exceeds the expiration period.

* * * * *